United States Patent [19]

Nagatoshi et al.

[11] 4,146,481
[45] Mar. 27, 1979

[54] FILTER

[75] Inventors: Susumu Nagatoshi; Yoshiharu Kato, both of Tokyo, Japan

[73] Assignees: Japanese National Railways; Limited Tesika, both of Tokyo, Japan

[21] Appl. No.: 803,983

[22] Filed: Jun. 6, 1977

[30] Foreign Application Priority Data

Jun. 17, 1976 [JP] Japan .............................. 51-79173[U]

[51] Int. Cl.² ............................................ B01D 29/42
[52] U.S. Cl. .................................. 210/232; 210/413; 210/488
[58] Field of Search ............... 210/488, 492, 232, 413, 210/414, 415

[56] References Cited

U.S. PATENT DOCUMENTS 3,568,842 3/1971 Buzek .................................... 210/307

FOREIGN PATENT DOCUMENTS 486397 6/1938 United Kingdom ..................... 210/488

Primary Examiner—Frank A. Spear, Jr.
Attorney, Agent, or Firm—Oblon, Fisher, Spivak, McClelland & Maier

[57] ABSTRACT

Disclosed herein is an improvement in a filter of the type having a plurality of filtering plates vertically spaced at fixed intervals to interpose filtering spaces therebetween and as many scrapers laid outwardly from the axis of the stack of filtering plates and inserted one each into the filtering spaces, i.e. between the adjacent filtering plates, the improvement which includes giving each filtering plate a perfectly circular periphery so as to avoid formation of any protuberance from the circumferences and, at the same time, disposing the scrapers so as to keep sliding contact with the adjacent filtering plates.

7 Claims, 7 Drawing Figures

FILTER

BACKGROUND OF THE INVENTION

1. Field of the Invention:

This invention relates to improvements in and concerning a system for the disposal of sewage (including excrements). It is particularly effective for use in a circulation type sewage disposal system such as a flush toilet on a railway vehicle.

2. Description of the Prior Art:

As disclosed in Japanese Utility Model Registrations No. 961449 and No. 961450 covering the inventions perfected by the same inventors, the conventional filter of this type has been intended for use in a circulation type sewage disposal system, which filter includes a filter proper having a multiplicity of slits formed in the peripheral surface thereof and also having the open end portions thereof rotatably set in position on a stationary seat, a suction pipe disposed to penetrate through and protrude upwardly from the interior of the filter proper and fastened to the stationary seat and scrapers laid outwardly from the axis of the filter proper and inserted into the grooves of the filter proper. The clear water passed through the filter is made to collect within the filter proper and it is then led through a suction pipe into the flush toilet for cyclic use. The suspended matter which has been deposited in the filtering spaces is removed by means of the scrapers to make the filter ready for reuse.

The filtering plates which make up the conventional filter of such a structure do not have a truly circular periphery but possess a periphery containing spaced protrusions each with a perforation for passing a clamping bolt (see FIG. 1). Moreover, the scrapers are not of a type slidably movable within a fixed range but of a type immovably fastened to a fixed shaft.

Despite the use of such stationary scrapers, the portions of the filtering plates which are designed to come into sliding contact with the scrapers must be formed in a circular shape in conformity with the overall loci of the motions of the scrapers since the scraping of deposited matter makes it necessary for the filter proper composed of a multiplicity of vertically spaced filtering plates to be rotated relative to the stationary scrapers. Consequently, it has been necessary to form protrusions outside the circular periphery of the filtering plates and bore perforations one each in the protrusions to permit passage of clamping bolts. Besides, since the scrapers are immovably positioned and are not allowed to move in the direction in which the filter proper rotates, a certain clearance must be allowed between the spacers inserted between the filtering plates and the scrapers in order to ensure smooth rotation of the filter proper.

In the conventional filter, therefore, the clearances prevent the filtering plates from coming into intimate contact with the scrapers, with the result that fibrous suspended matter is liable to lodge in the clearances. The fibrous suspended matter thus caught in the clearances gradually increases in bulk eventually to clog the filtering spaces. Furthermore, when the filter proper is rotated, the protrusions formed outside the filtering plates generate resistance and consequently form an eddy of fluid outside the filter proper and this eddy agitates the sewage particles which have already settled. Thus, the object of filtering cannot be fulfilled as originally contemplated.

SUMMARY OF THE INVENTION

An object of the invention is to provide improvements to overcome the disadvantages described hereinabove and permit safe and efficient removal of the sewage particles deposited in the filtering spaces intervening between the filtering plates.

Another object of this invention is to provide an improved filter which enables a perfect, intimate contact to be established between the scrapers and adjacent filtering plates and thereby prevent sewage particles from collecting in the filtering spaces.

Still another object of this invention is to provide an improved filter wherein the filtering plates are given an increased wall thickness around the perforations bored therein for passage of clamping bolts so that the adjacent filtering plates vertically spaced will be engaged with each other intimately enough to preclude otherwise possible development of shearing force in the bolts.

To accomplish the objects described above according to this invention, there is provided a filter having a plurality of filtering plates vertically spaced at fixed intervals to interpose filtering spaces therebetween and as many scrapers laid outwardly from the axis of the stack of filtering plates and inserted one each into the filtering spaces, which filter is characterized by having the peripheries of the filtering plates formed in a perfectly circular shape and the scrapers pivotally fastened so as to be slidably movable within a fixed range.

BRIEF DESCRIPTION OF THE DRAWINGS

Various other objects, features and attendant advantages of the present invention will be more fully appreciated as the same becomes better understood from the following detailed description when considered in connection with the accompanying drawings in which like reference characters designate like or corresponding parts throughout the several views, and wherein.

DETAILED DESCRIPTION OF THE PREFERRED EMBODIMENTS

Figure 1:
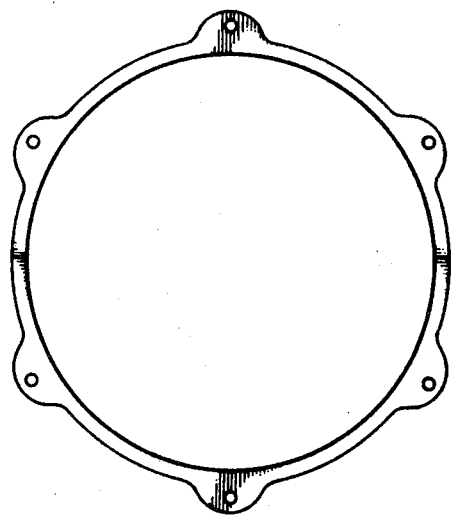
FIG. 1 is a plan view of one example of a conventional filter.
Figure 2:
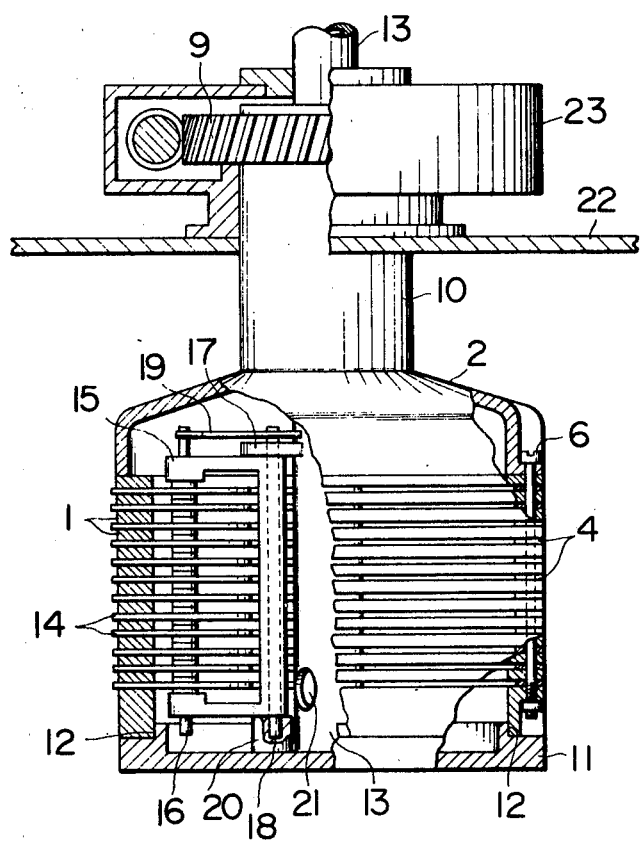
FIG. 2 is a partially cut-away front view of one preferred embodiment of the present invention.
Figure 3:
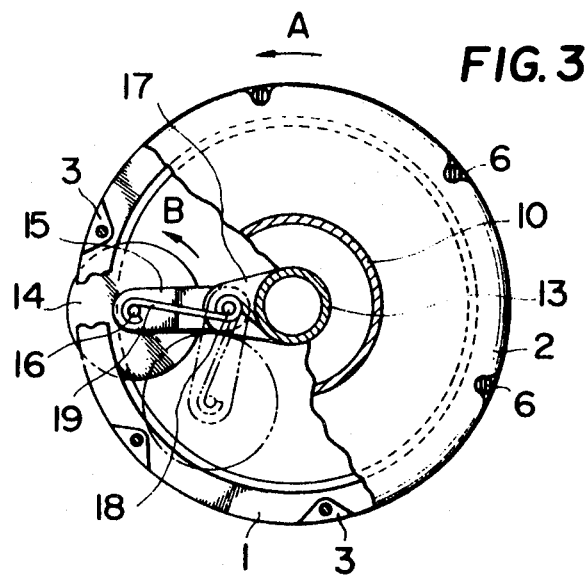
FIG. 3 is a partially cut-away plan view of the filter of FIG. 2.
Figure 4:
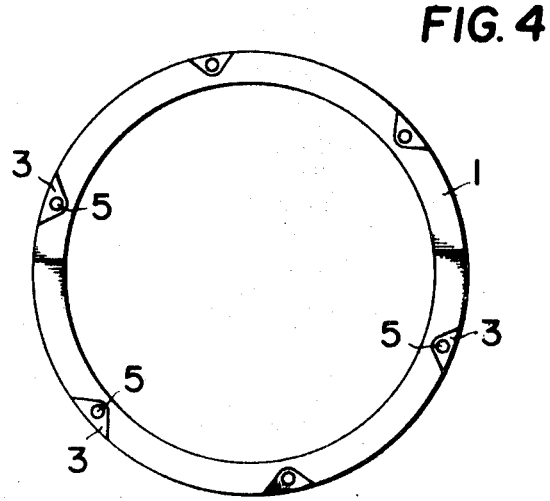
FIG. 4 is a plan view of one preferred embodiment of the filtering plate of the present invention.
Figure 5:
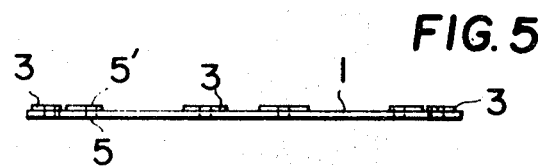
FIG. 5 is a front view of the filtering plate of FIG. 4.

In FIGS. 2–5, 1 denotes each or all of the plurality of thin annular filtering plates having circular inner and outer boundaries. The plurality of the filtering plates are spaced at fixed intervals by intervening spacers 3 and immovably fastened in position to give rise to filtering spaces 4 therebetween. Each filtering plate 1 has flat upper and lower surfaces and spacers 3 are disposed inside along the outer boundary of the filtering plate 1 so that no part of the spacer will protrude out of the outer boundary. The intervention of spacers between the adjacent filtering plates give rise to filtering spaces 4. As illustrated in FIG. 4, a desired number of spacers 3 are regularly spaced inside along the outer boundary of the filtering plate 1, with perforations 5' bored one each through the spacers. Also in the vertically spaced filtering plates at the positions corresponding to perforations 5', there are bored perforations 5 for passage of clamping bolts. With bolts 6, the filtering plates 1 and the interposed spacers are integrally connected.

Figure 6:
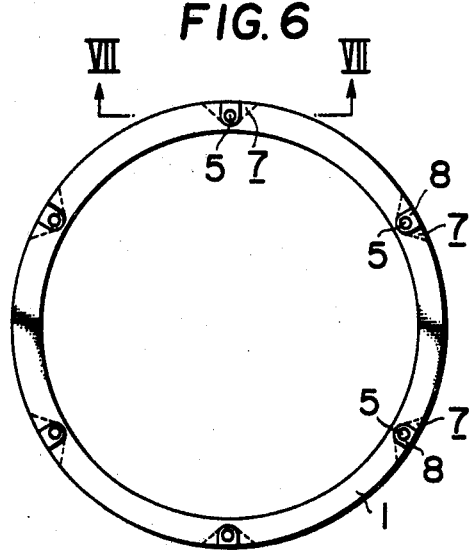
FIG. 6 is a plan view of another preferred embodiment of the filtering plate of this invention.
Figure 7:
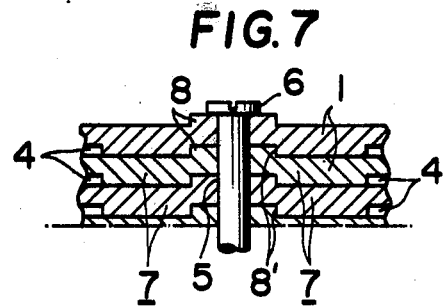
FIG. 7 is a cross section taken along the line VII—VII of the plan view of FIG. 6.

The filtering plates 1 may otherwise be formed integrally with spacers as illustrated in FIGS. 6–7. To be more specific, each filtering plate 1 is given an increased wall thickness around each perforation 5 bored for passage of a clamping bolt. On one surface of the portion of an increased wall thickness is formed an engaging projection 8. On the other surface of the portion is formed an engaging recess 8' corresponding to the engaging projection 8. When the plurality of filtering plates are piled up, the engaging projections 8 of one filtering plate 1 fit snugly into the engaging recesses 8' of the adjacent filtering plate while the portions of the two adjacent filtering plates having normal thickness give rise to a filtering space 4 therebetween.

The filter proper 2 has an open lower end and has its upper end forming an interlocked cylindrical unit 10 to which is fastened a worm gear 9 adapted to be driven by a motor (not shown). By 11 is denoted a stationary seat having a guiding groove 12 formed in the peripheral portion. Into the guiding groove 12 is fitted rotatably the filter proper 2 which is rotated through the medium of the interlocked cylindrical unit 10 by the worm gear 9. The stationary seat 11 is not rotated by the rotation of the filter proper 2. Denoted by 13 is a suction pipe pierced through the stationary seat 11. This suction pipe 13 penetrates through the vertically spaced filtering plates 1 and protrudes upwardly from the interlocked cylindrical unit 10. By 14 are denoted scrapers in the shape of disks, which are extended outwardly from the axis in the intervening filtering spaces 4 so that they will partly thrust out of the outer boundaries of the filtering plates. These scrapers are rotatably fastened to pulleys with a fixing shaft 16 inserted through sliding members 15. The sliding members 15 are pivotally fastened with a supporting shaft 18 onto connecting member 17 immovably attached to the suction pipe 13. By virtue of a spring 19 mounted between the fixing shaft 16 and the supporting shaft 18, the sliding members 15 are caused to produce a sliding motion within a fixed range in the direction of the arrow, namely, in the direction in which the filtering plates 1 are rotated as indicated by an alternate one long and one short dash line in FIG. 3. Consequently, the scrapers 14 are made to slide in the corresponding filtering spaces 4 within a fixed range. The scrapers may otherwise be so arranged in the structure that they will be caused by a freely expandible coiled spring or other similar means to produce a sliding motion within a fixed range in only one direction perpendicular to the direction of the rotation of the filtering plates 1, instead of producing a sliding motion in the direction of the arrow. By 20 is denoted a bearing serving to support the supporting shaft 18, by 21 a suction inlet opening into the lower end of the suction pipe 13, by 22 an upper shell of the tank and by 23 a housing immovably attached to the upper surface of the tank's upper shell 22 for sheltering a worm gear.

The operation of the present invention will now be described. First, the motor is operated to drive the worm gear 9 and rotate the filter proper 2 in the direction of the arrow A through the medium of the interlocked cylindrical unit 10. Consequently, the scrapers 14 interposed between the filtering spaces 4 are revolved in the direction of the arrow B while keeping in rubbing contact with the filtering plates 1, with the result that the suspended matter deposited in the filtering spaces 4 in consequence of the filtering operation is scraped off and discharged out of the filter. As the filter proper continues its rotation, the scrapers 14 soon collide into the spacers 3 disposed between the filtering plates 1. The scrapers are consequently pushed toward the interior of the filtering plates 1 with the supporting shaft 18 as the fulcrum and, at the same time, are revolved in the direction of the arrow B. They continue their rotation in the direction of the arrow A until they reach the apexes of said spacers 3 (as indicated by the alternate one long and one short dash in FIG. 3). As the filter proper 2 further rotates and the scrapers 14 pass the apexes of the spacers 3, the scrapers 14 are revolved along the spacers 3 in the direction of the arrow B by overcoming the rotation of the filtering plates 1 by virtue of the resilient force imparted by the spring 19 and, at the same time, they are rotated in the direction of the arrow A until they resume their original position. During the series of motions described above, the scrapers 14 are pressed strongly against the spacers 3 by the resilient force of the spring 19 until they reach the apexes of spacers 3. After they pass the apexes, the scrapers are strongly pushed out by the spring 19. Owing to the intimate contact, the scrapers provide effective removal of sewage particles adhering to the spacers and their vicinities and at the same time those sticking to the filtering spaces 4. Since the scrapers repeat such an action each time they collide into the spacers 3, all the sewage particles adhering to the filtering spaces 4 are scraped off and discharged out of the filter proper 2, with only the filter water allowed to remain in the filter proper.

When the filtering plates 1 are formed in a structure like the one shown in FIGS. 6–7, each adjacent pair of filtering plates are joined through intimate contact between the engaging projections 8 in the one filtering plate and the corresponding engaging recesses 8' in the other. When the filtering plates are rotated, the portions of increased wall thickness 7 which serve as the spacers prevent any slip. Consequently, no shearing force is exerted upon the bolts which are inserted through the perforations 5 bored in the portions 7 of increased wall thickness. The freedom from otherwise possible development of shearing force provides the bolts 6 with enhanced durability, alleviates the maintenance work given to the filter and, at the same time, contributes greatly to the maintenance of filter performance. The filter proper 2 may be rotated in the reverse direction as occasion demands. In that case, the scrapers 14 are operated in exactly the opposite direction.

The suction pipe 13 is immovably fastened to the stationary seat 10 and is not rotated by the rotation of the filter proper 2. The filtered water retained inside the filter proper 2, therefore, is withdrawn through the suction inlet of the suction pipe 12 which is driven by a pump (not shown) installed outside the sewage tank.

The invention has so far been described with respect to an embodiment wherein the filter proper itself is rotated. The series of operations described above are also applicable to an embodiment wherein the scrapers are rotated instead of the filter proper.

As is clear from the foregoing description, the filter of the present invention provides substantially complete discharge of sewage particles adhering to the filtering spaces and permits the filtering of sewages to be carried out with added filtration effec without agitating the settled deposits by the eddy motion. If the scrapers are pivotally fastened so that they partly thrust out of the outer boundaries of the filtering plates and they are allowed to produce a sliding motion within a fixed range along the direction of the rotation of the filtering plates or in the direction perpendicular to the direction in which the filtering plates are rotated, then the scrapers and the filtering plates are brought into perfect engagement. The establishment of such an intimate engagement brings about an effect of never allowing sewage particles to stagnate in the filtering spaces. As the result, the filtering of sewage particles is carried out more readily and safely. When the filtering plates are designed so that the filtering plates and corresponding spacers are integrally formed, the bolts 6 which are used for keeping the filtering plates 1 in tight union are prevented from developing shearing force. If the bolts 6 should be deformed, then sewage particles would adhere excessively to the spacers 3 located close to such deformed bolts. This effect of providing the bolts with improved durability contributes to preventing excessive adhesion of sewage particles to the filtering plates and to improving the performance of the filter. The improvement in the durability of bolts further brings about an effect that the maintenance work otherwise required to be given to the filter owing to deformation of bolts will be eliminated.

When the filtering plates and the spacers are formed integrally, the necessity of inserting the spacers between the filtering plates, which calls for a great deal of time and skill, can be omitted. The omission of this work is advantageous from the standpoint of the filtering assembly and promises a reduction of cost.

Obviously numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A filter which comprises:
    a plurality of stacked filtering plates;
    a plurality of spacers disposed between stacked filtering plates for vertically spacing the stacked filtering plates at fixed intervals to interpose filtering spaces therebetween; and,
    a plurality of pivotally fastened scrapers inserted one each into said filtering spaces from the interior of the stacked filtering plates, wherein the peripheries of the plurality of stacked filtering plates are formed in a perfectly circular shape and the scrapers are slidably movable within a fixed range.

2. The filter according to claim 1, wherein said circular filtering plates have flat upper and lower surfaces and the spacers are disposed completely inside the outer boundaries of said filtering plates so as to give rise to the filtering spaces between the filtering plates.

3. The filter according to claim 1, wherein the plurality of stacked filtering plates are perpendicularly stacked up one on top of another and are given an increased wall thickness around perforations bored therein for passage of clamping bolts, engaging projections are formed on one surface of the portions of increased wall thickness and corresponding engaging recesses formed on the other surface of said portions so that when the plurality of filtering plates are piled upon, the engaging projections of the filtering plates are disposed within the engaging recesses of the adjacent filtering plates while, at the same time, the portions of the adjacent filtering plates having normal thickness give rise to filtering spaces therebetween.

4. The filtering according to claim 1, which further comprises means for rotating said plurality of filtering plates wherein the scrapers are pivotally attached so as to slightly thrust out of the outer boundaries of the filtering plates and produce a sliding motion within a fixed range along the direction of the rotation of the filtering plates.

5. The filter according to claim 1, which further comprises means for rotating said plurality of filtering plates, wherein the scrapers are pivotally attached so as to slightly thrust out of the outer boundaries of the filtering plates and produce a sliding motion within a fixed range in the direction perpendicular to the direction in which the filtering plates are rotated.

6. The filter according to claim 1 which further comprises:
    a support shaft;
    a plurality of sliding members, each of which interconnects said support shaft and said plurality of scrapers; and,
    biasing means for pivoting said scrapers so as to be slidably movable within a fixed range.

7. The filter according to claim 6 which further comprises:
    a fixed shaft supporting said plurality of scrapers wherein said biasing means comprises a spring interconnecting said fixed shaft supporting said plurality of scrapers and said support shaft for said sliding members.

* * * * *